United States Patent
Yoo et al.

(10) Patent No.: US 7,809,878 B2
(45) Date of Patent: Oct. 5, 2010

(54) APPARATUS AND METHOD FOR CONTROLLING FLASH MEMORY

(75) Inventors: Jae-hyuck Yoo, Seoul (KR); Song-ho Yoon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 507 days.

(21) Appl. No.: 11/656,535

(22) Filed: Jan. 23, 2007

(65) Prior Publication Data

US 2007/0198767 A1  Aug. 23, 2007

(30) Foreign Application Priority Data

Feb. 23, 2006  (KR) .................... 10-2006-0017771

(51) Int. Cl.
*G06F 12/00* (2006.01)
(52) U.S. Cl. .................................... 711/103
(58) Field of Classification Search ............... None
See application file for complete search history.

(56) References Cited

U.S. PATENT DOCUMENTS

| | | | |
|---|---|---|---|
| 5,937,423 A * | 8/1999 | Robinson .................... 711/103 |
| 6,279,069 B1 * | 8/2001 | Robinson et al. ............ 711/103 |
| 2005/0160218 A1 * | 7/2005 | See et al. .................... 711/103 |
| 2005/0182893 A1 | 8/2005 | Suh |
| 2006/0041712 A1 * | 2/2006 | Sun et al. .................... 711/103 |
| 2006/0161725 A1 * | 7/2006 | Lee et al. .................... 711/103 |
| 2008/0086631 A1 * | 4/2008 | Chow et al. .................... 713/2 |
| 2008/0098164 A1 * | 4/2008 | Lee et al. .................... 711/103 |

FOREIGN PATENT DOCUMENTS

| | | |
|---|---|---|
| CN | 1648883 A | 8/2005 |
| JP | 6-250827 A | 9/1994 |
| JP | 10-97419 A | 4/1998 |
| JP | 2001-338269 A | 12/2001 |
| JP | 2002-203217 A | 7/2002 |
| JP | 2002-278781 A | 9/2002 |
| JP | 2003-308240 A | 10/2003 |
| JP | 2004-206740 A | 7/2004 |
| JP | 2005-301831 A | 10/2005 |
| KR | 10-2005-0041604 A | 5/2005 |
| WO | WO 03/009136 A1 | 1/2003 |

OTHER PUBLICATIONS

Office Action dated May 18, 2010, issued in counterpart Japanese Application No. 2007-040389.

* cited by examiner

*Primary Examiner*—Brian R Peugh
(74) *Attorney, Agent, or Firm*—Sughrue Mion, PLLC

(57) ABSTRACT

Provided are an apparatus and method for controlling a flash memory, more particularly, an apparatus and method for controlling flash memory that updates control information of a flash memory stored in a predetermined volatile memory when the type of flash memory is changed and controls the changed flash memory using the updated control information. The apparatus includes a flash memory storing its own control information, a first memory storing a programming code for controlling the flash memory, a control unit generating a control code for controlling the flash memory by assigning the control information to the programming code, and a transceiver transmitting the control code.

14 Claims, 6 Drawing Sheets

APPARATUS AND METHOD FOR CONTROLLING FLASH MEMORY

CROSS REFERENCE TO RELATED APPLICATION

This application claims priority from Korean Patent Application No. 10-2006-0017771 filed on Feb. 23, 2006 in the Korean Intellectual Property Office, the disclosure of which is incorporated herein by reference in its entirety.

BACKGROUND OF THE INVENTION

1. Field of the Invention

Methods and apparatuses consistent with the present invention relate to controlling a flash memory and more particularly to controlling flash memory that updates control information of a flash memory stored in a predetermined volatile memory when the type of flash memory is changed and controls the changed flash memory using the updated control information.

2. Description of the Related Art

A flash memory is a nonvolatile memory to which power is continuously supplied, and the contents of a flash memory can be erased and reprogrammed in terms of blocks. The flash memory is a modification of an Electrically Erasable Programmable Read-Only Memory (EEPROM). Unlike the EEPROM, in which the contents can be erased and corrected in terms of bytes, in the flash memory, since the contents are corrected in blocks, a processing speed to erase and correct contents is high. The flash memory is often used to store control codes, such as Basic Input/Output System (BIOS) of a Personal Computer (PC). When the BIOS needs to be corrected, the contents are recorded in blocks in the flash memory, not bytes, and thus the correction is easily performed. However, unlike the existing Random Access Memory's (RAMs), the flash memory is not useful since addresses are assigned in bytes, not blocks.

The flash memory obtains its name because a flash memory microchip is constructed such that portions of memory cells on the microchip can be erased by only one operation like a flash. Erasure is performed by a Fowler-Nordheim tunneling effect. That is, electrons pass through a thin dielectric material and eliminate charges from floating gates respectively connected to the memory cells.

The flash memory is an active device that receives commands from a programmer and executes the commands, not a passive device that merely has a storage device, a refresh circuit, and an error correction circuit, such as Dynamic RAM (DRAM). The commands are issued by a Command User Interface (CUI), and the entire status of the system is managed by a Write State Machine (WSM). The kind of the commands to be provided include a reading command, a writing command, and other control commands.

FIG. 1 is a diagram showing a known flash memory control system. The flash memory control system has a flash memory controller 10 and a flash memory 20.

Here, the flash memory controller 10 has a core processor 11, a One Time Programmable (OTP) memory 12, a status checking unit 13, and a control code transmitting unit 14.

The OTP memory 12 stores control codes for controlling the flash memory 20. The control codes include a reading control code, a writing control code, a reset control code, a block locking control code, and the like.

The status checking unit 13 checks the status of the flash memory 20. That is, the status checking unit 13 checks whether the flash memory 20 is in an active mode or in a standby mode.

The control code transmitting unit 14 transmits the control codes stored in the OTP memory 12 to the flash memory 20.

The core processor 11 refers to the status of the flash memory 20 checked by the status checking unit 13 so as to extract a control code from the OTP memory 12, and causes the control code transmitting unit 14 to transmit the extracted control code. Then, the core processor 11 performs the overall control of the OTP memory 12, the status checking unit 13, and the control code transmitting unit 14.

In the conventional flash memory control system described above, since only control codes for a specified flash memory are stored, when the kind of a flash memory is changed, the flash memory controller 10 cannot control a new flash memory.

Accordingly, in order to control flash memories having different control information, an additional flash memory controller including an OTP memory, in which corresponding control codes are stored, is required, which leads to an increase in costs.

In U.S. Patent Publication No. 2005-182893, there is disclosed a memory system that includes a memory controller controlling an access to a nonvolatile memory and a volatile memory in response to a memory request and having a memory storing address information of data stored in the volatile memory, a NAND flash memory, and a RAM storing data of the NAND flash memory.

In this case, however, in order to store data of the NAND flash memory in the RAM, an additional process needs to be executed, which causes inconvenience. For example, in order to sequentially control different flash memories, whenever the flash memory is replaced, a user needs to store data of a new NAND flash memory.

Accordingly, a technology that allows the control of different flash memories to be executed in a simple manner is needed.

SUMMARY OF THE INVENTION

It is an aspect of the present invention to update control information of a flash memory stored in a predetermined volatile memory when the type of flash memory is changed and to control the changed flash memory using the updated control information.

It is another aspect of the present invention to extract control information stored in a flash memory, and to control the flash memory using the extracted control information.

Aspects of the present invention are not limited to those mentioned above, and other aspects of the present invention will be apparently understood by those skilled in the art through the following description.

According to one aspect of the present invention, there is provided an apparatus for controlling a flash memory, the apparatus including a flash memory storing its own control information, a first memory storing a programming code for controlling the flash memory, a control unit generating a control code for controlling the flash memory by assigning the control information to the programming code, and a transceiver transmitting the control code.

According to another aspect of the present invention, there is provided a method of controlling a flash memory, the method including receiving control information from a flash memory, generating a control code for controlling the flash memory by assigning the control information to the programming code, and transmitting the control code.

BRIEF DESCRIPTION OF THE DRAWINGS

The above and other aspects of the present invention will become apparent and more readily appreciated by describing in detail exemplary embodiments thereof with reference to the attached drawings, in which.

DESCRIPTION OF THE PREFERRED EMBODIMENTS

Figure 1:
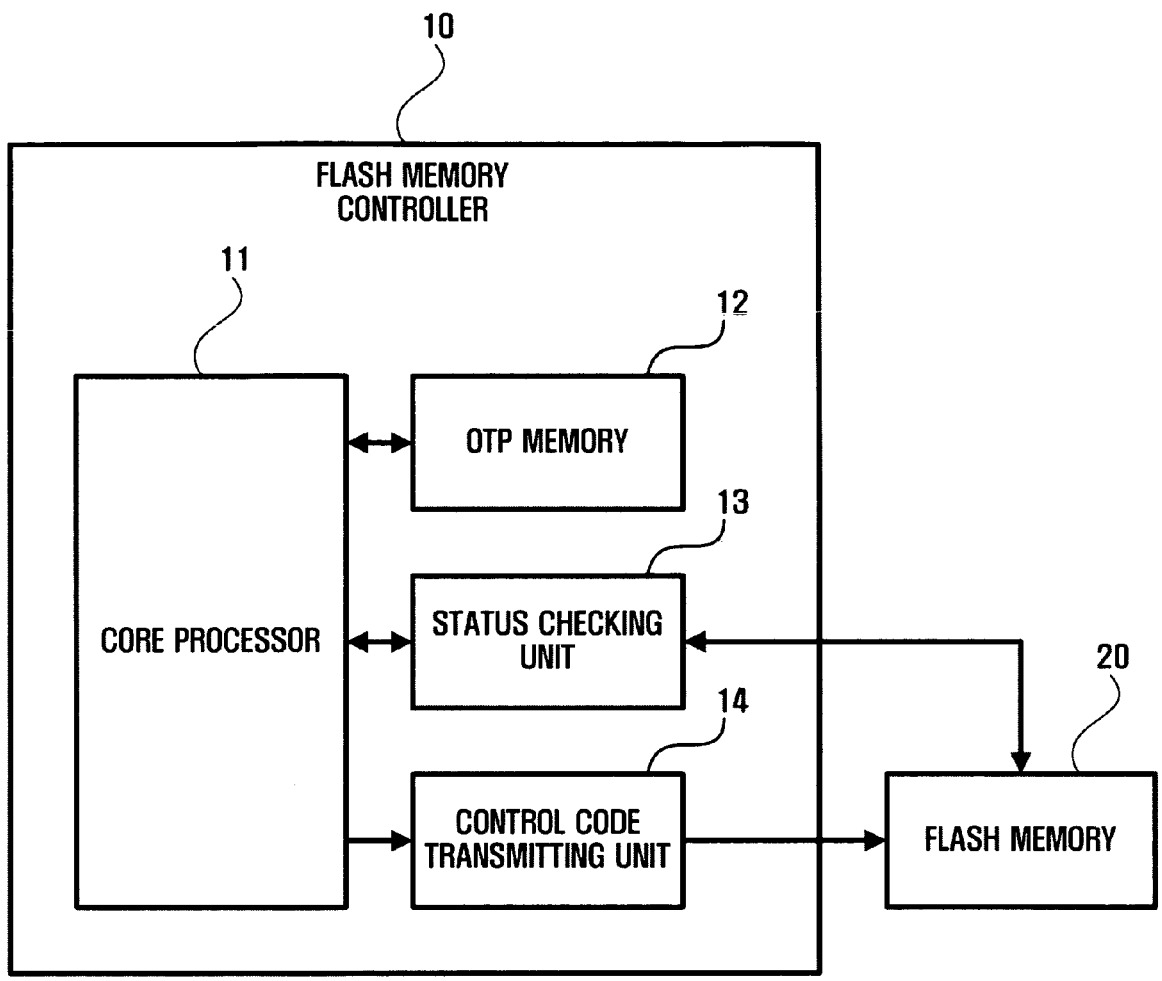
FIG. 1 is a diagram showing a known flash memory control system.

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the present invention to those skilled in the art, and the present invention will only be defined by the appended claims. Like reference numerals refer to like elements throughout the specification.

Hereinafter, exemplary embodiments of the present invention will be described in detail with reference to the accompanying drawings.

Figure 2:
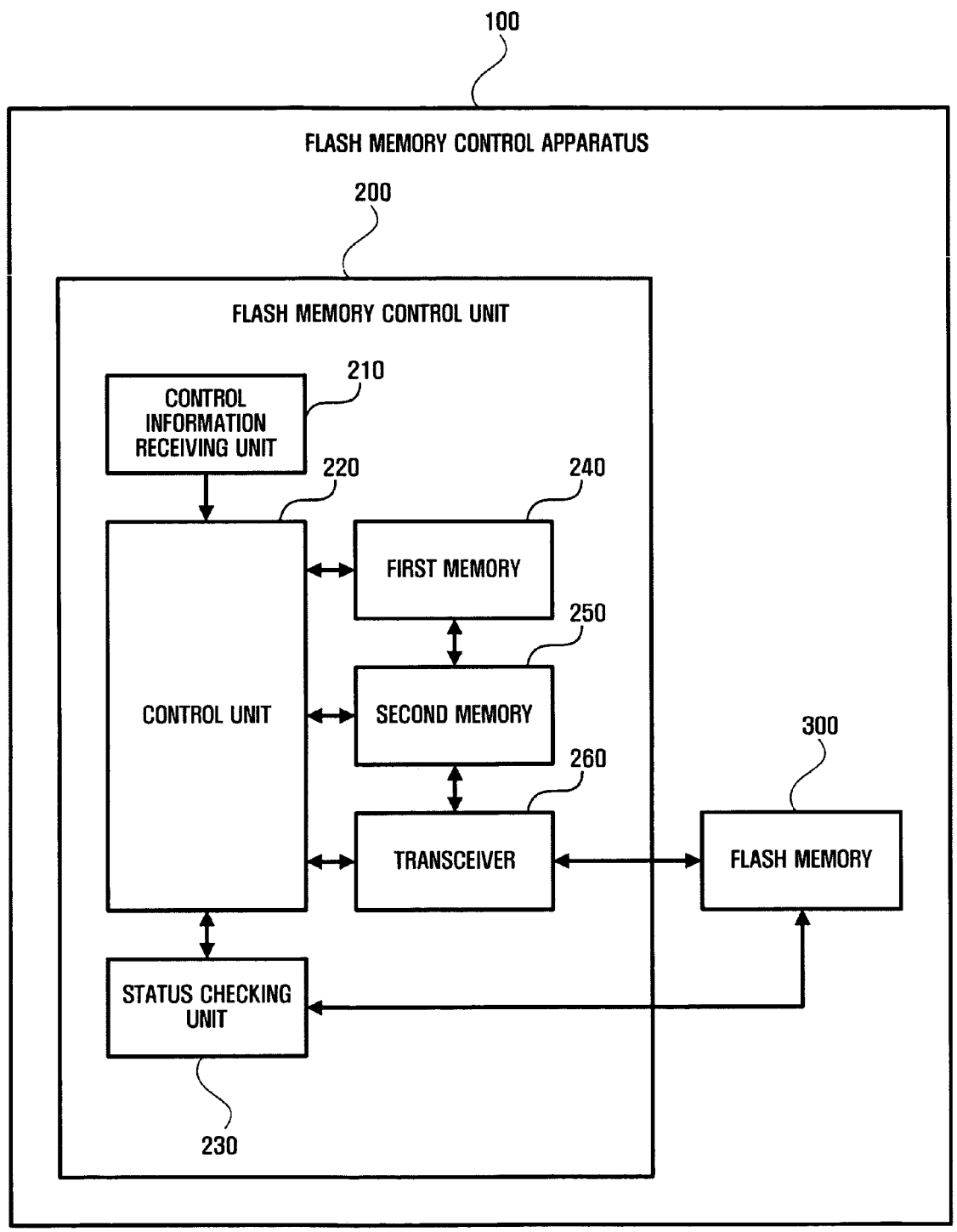
FIG. 2 is a block diagram showing an apparatus for controlling a flash memory according to an exemplary embodiment of the present invention.

FIG. 2 is a block diagram showing an apparatus for controlling a flash memory according to an exemplary embodiment of the present invention. An apparatus for controlling a flash memory (hereinafter, referred to as "flash memory control apparatus") 100 includes a flash memory control unit 200 and a flash memory 300. The flash memory control unit 200 includes a control information receiving unit 210, a control unit 220, a status checking unit 230, a first memory 240, a second memory 250, and a transceiver 260.

The flash memory 300 stores its own control information. The flash memory 300 is a nonvolatile memory to which power is continuously supplied, and the contents of the flash memory can be erased and reprogrammed in terms of blocks. Here, the control information is information required for controlling the flash memory 300 and includes at least one of the number of dies, the number of planes by dies, the number of blocks, the size of a page, the number of pages by blocks, the number of sectors by pages, a position of a bad mark, supportability of a cache operation, and supportability of a copy back operation.

For example, the control information includes information for operations of reading data from the flash memory 300, writing data into the flash memory 300, erasing data of the flash memory 300, resetting the flash memory 300, and locking blocks in the flash memory 300.

Here, the locking of blocks means the limit of an access to the blocks such that the reading operation of the stored data or other commands are not executed while data is being written into the flash memory 300 or while the data of the flash memory 300 is being erased.

The first memory 240 stores a programming code for controlling the flash memory 300. The programming code is a code for reading, writing, or other controls for the flash memory 300. In order to allow this code to be applied to all flash memories, not to the specified flash memory, information peculiar to the flash memory may not be included.

Further, the first memory 240 may store control information for a specified flash memory arbitrarily selected by a user. For example, control information for one specified flash memory that is frequently used by the user is stored in the first memory 240, such that a process of storing the control information stored in the flash memory into the second memory 250 may be omitted. Here, the first memory 240 may store control information for a plurality of specified flash memories.

The first memory 240 is preferably a nonvolatile memory. More preferably, in view of a reduction in costs, an OTP (One Time Programmable) memory is used. Accordingly, once stored, the programming code stored in the first memory 240 and the control information of the specified flash memory may not be updated.

The second memory 250 temporarily stores the control information of flash memory 300. Here, the control information of flash memory 300 may be received from the flash memory 300 or may be separately input. For example, the control information stored in the flash memory 300 may be received and temporarily stored in the second memory 250 in order to control the flash memory 300. Alternatively, the control information which is input in order to update the flash memory 300 may be temporarily stored prior to being transmitted to the flash memory 300.

The control unit 220 generates a control code for controlling the flash memory 300 by assigning the control information to the programming code from the first memory 240. Here, the control information may be one stored in the first memory 240, one stored in the second memory 250, or one extracted directly from the flash memory 300.

For example, when the second memory 250 is not provided, the control unit 220 compares the control information stored in the flash memory 300 and the control information stored in the first memory 240 and then, when both are consistent with each other, generates the control code by assigning the control information stored in the first memory 240 to the programming code. When both are inconsistent with each other, the control unit 220 generates the control code by assigning the control information extracted from the flash memory 300 to the programming code.

Meanwhile, when the second memory 250 is provided, the control unit 220 first compares, as described above, the control information stored in the flash memory 300 and the control information stored in the first memory 240 and then, when both are consistent with each other, generates the control code by assigning the control information stored in the first memory 240 to the programming code. When both are inconsistent with each other, the control unit 220 generates the control code by storing the control information extracted from the flash memory 300 in the second memory 250 and then assigning the control information stored in the second memory 250 to the programming code.

In addition, the control unit 220 performs the overall control of the control information receiving unit 210, the status checking unit 230, the first memory 240, the second memory 250, the transceiver 260, the flash memory 300, and the flash memory control apparatus 100.

The transceiver 260 transmits the control code generated by the control unit 220 to the flash memory 300. Further, the transceiver 260 receives the control information of the flash memory 300 for storing the control information stored in the flash memory 300 in the second memory 250, and transmits updated control information for updating the flash memory 300 to the flash memory 300.

The control information receiving unit 210 receives new control information for updating the flash memory 300. The received control information may be directly transmitted to the flash memory 300 through the transceiver 260 or may be temporarily stored in the second memory 250 and then transmitted to the flash memory 300. If the flash memory 300 is updated, the updated flash memory 300 stores the new control information. Subsequently, upon the control of the updated flash memory 300, a control code corresponding to the new control information is generated by the control unit 220 and then transmitted to the updated flash memory 300.

The status checking unit 230 checks the status of the flash memory 300. That is, the status checking unit 230 checks whether the flash memory 300 is executing the reading operation, the writing operation, or other control operations. The control unit 220 refers to the status of the flash memory 300 checked by the status checking unit 230 and decides whether to transmit the control code to the flash memory 300.

Figure 3:
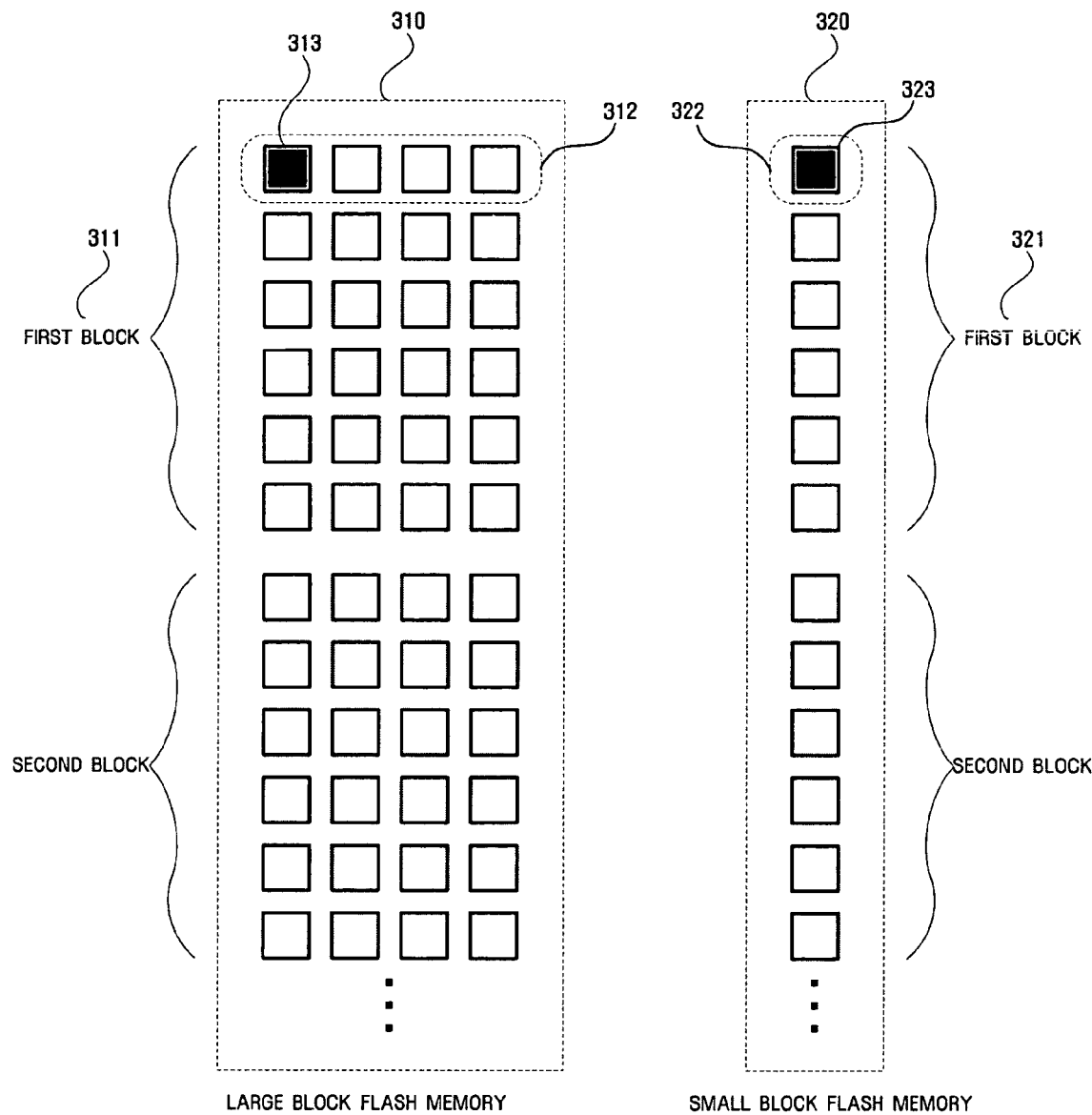
FIG. 3 is a diagram showing a flash memory, in which control information is stored, according to an exemplary embodiment of the present invention.

FIG. 3 is a diagram showing a flash memory, in which control information is stored, according to an exemplary embodiment of the present invention.

The flash memory 300 may be divided into a large block flash memory 310 and a small block flash memory 320, and thus the arrangement of sectors included in each block may be changed. That is, a plurality of sectors exist on one page in case of the large block flash memory 310, while one sector exists on one page in case of the small block flash memory 320.

Accordingly, the control information of flash memory 300 is preferably stored in the first block 313 or 323 on the first page 312 or 322 of the first block 311 or 321. This is because, when the control information of the flash memory 300 is stored at an arbitrary position, the flash memory control unit 200 may not recognize the control information of the flash memory 300 and thus, may not transmit the control code for extracting the control information.

Further, the control information may be stored at an arbitrary position set by a user. At this time, the flash memory control unit 200 may extract the control information for a flash memory at a position set by the user.

Then, as for other data, the flash memory 300 that stores the control information may store and update other data using only regions excluding a region where the control information is stored.

Figure 4:
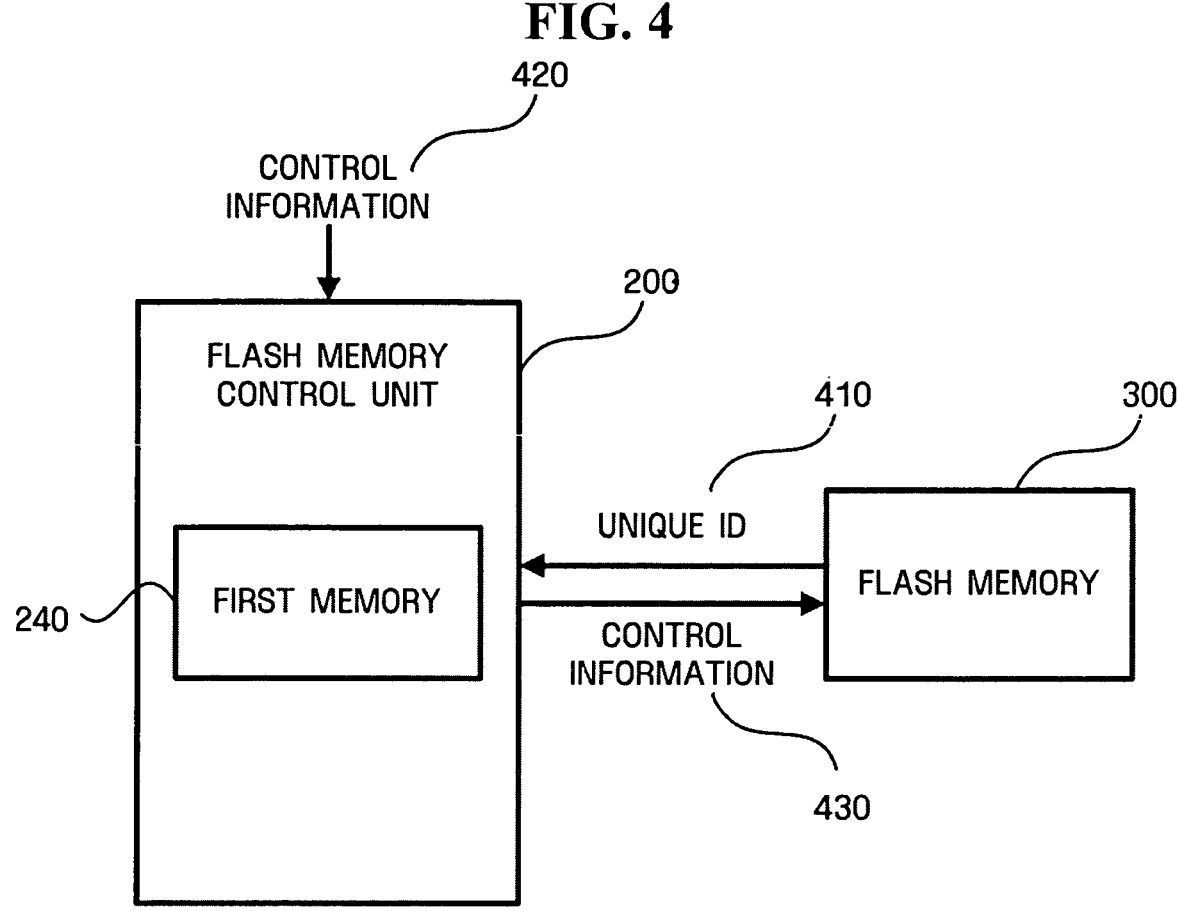
FIG. 4 is a conceptual diagram showing an example where control information is transmitted to a flash memory, according to an exemplary embodiment of the present invention.

FIG. 4 is a conceptual diagram showing an example where control information is transmitted to a flash memory, according to an exemplary embodiment of the present invention.

When the flash memory 300 is manufactured, the user may insert the control information 430 into the flash memory 300. At this time, the control information 430 may be inserted using the flash memory control unit 200. Specifically, first, the control information receiving unit 210 of the flash memory control unit 200 receives the control information 420. Then, the received control information 420 is temporarily stored in the second memory 250, and the temporarily stored control information 420 is transmitted to the flash memory 300 through the transceiver 260.

At this time, as described above with reference to FIG. 3, the control information 420 may be stored in the first sector 313 or 323 on the first page 312 or 322 of the first block 311 or 321 or may be stored at a separate position set by the user.

The flash memory control unit 200 may insert the control information for all flash memories, as well as the specified flash memory. Accordingly, a connection device that connects the transceiver 260 and the flash memory 300 is preferably a device by which the connection and disconnection of the flash memory 300 is easily performed. Then, the flash memory control unit 200 receives the control information 420 corresponding to the connected flash memory 300 from the user and inserts it into the flash memory 300.

Meanwhile, when the connected flash memory 300 is the specified flash memory arbitrarily selected by the user, the flash memory control unit 200 may insert the control information for the specified flash memory stored in the first memory 240 into a predetermined region of the connected flash memory 300. At this time, the control information stored in the first memory 240 may be the control information for a plurality of specified flash memories. That is, a plurality of different control information are stored in the first memory 240. At this time, the flash memory control unit 200 may extract control information 430 to be transmitted using the unique ID 410 of the flash memory 300 received from the flash memory 300.

For example, the flash memory 300 transmits its own unique ID 410 upon the connection to the flash memory control unit 200, and the flash memory control unit 200 that receives the unique ID 410 checks whether or not the control information corresponding to the unique ID 410 is stored in the first memory 240. Then, when the corresponding control information exists, the flash memory control unit 200 extracts the corresponding control information and transmits the extracted control information to the flash memory 300. When the corresponding control information does not exist, the flash memory control unit 200 transmits, to the flash memory 300, the control information 420 that is input from the user through the control information receiving unit 210.

As described above, the flash memory 300 may be divided into the large block flash memory 310 and the small block flash memory 320, and writing methods for the flash memories 310 and 320 may be different. Accordingly, when inserting the control information 430 into the flash memory 300, the flash memory control unit 200 may test two methods corresponding to the kinds of the flash memory 300.

Figure 5:
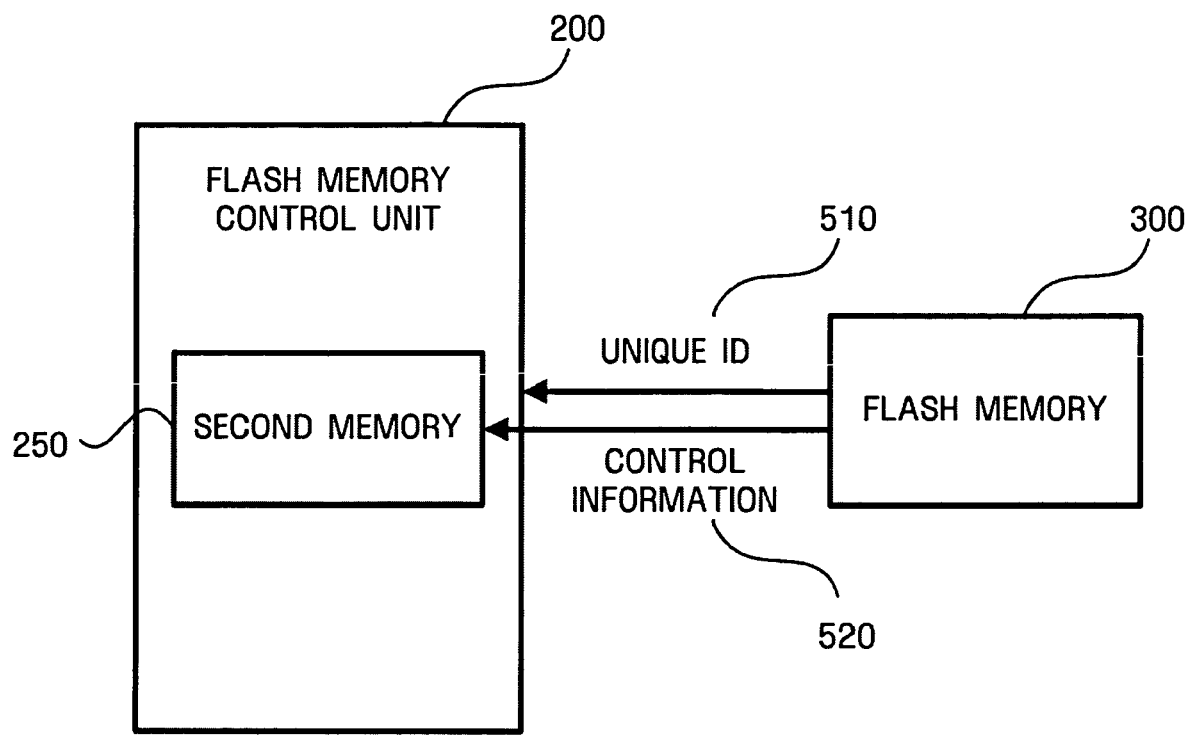
FIG. 5 is a conceptual diagram showing an example where control information is stored in a second memory, according to an exemplary embodiment of the present invention.

FIG. 5 is a conceptual diagram showing an example where control information is stored in the second memory 250, according to an exemplary embodiment of the present invention.

In order to control the flash memory 300, the flash memory control unit 200 first receives a unique ID 510 from the flash memory 300. Then, the flash memory control unit 200 checks whether or not control information corresponding to the received unique ID 510 is stored in the first memory 240, and if the corresponding control information is stored, the flash memory control unit 200 generates the control code for the connected flash memory 300 using the stored control information and the programming code, and controls the flash memory 300 using the generated control code.

Meanwhile, if the control information corresponding to the received unique ID 510 is not stored in the first memory 240, the flash memory control unit 200 extracts control information 520 stored in a predetermined region of the flash memory 300. At this time, the flash memory control unit 200 may extract the control information 520 from the first sector 313 or 323 on the first page 312 or 322 of the first block 311 or 321 in the storage region of the flash memory 300, or may extract the control information 520 from a prescribed position. Then, the extracted control information 520 is stored in the second memory 250 in order to control the flash memory 300.

The flash memory 300 may be divided into the large block flash memory 310 and the small block flash memory 320, and reading methods for the flash memories 310 and 320 may be different. Accordingly, when extracting the control information 520 from the flash memory 300, the flash memory control unit 200 may test two methods corresponding to the kinds of the flash memory 300.

Figure 6:
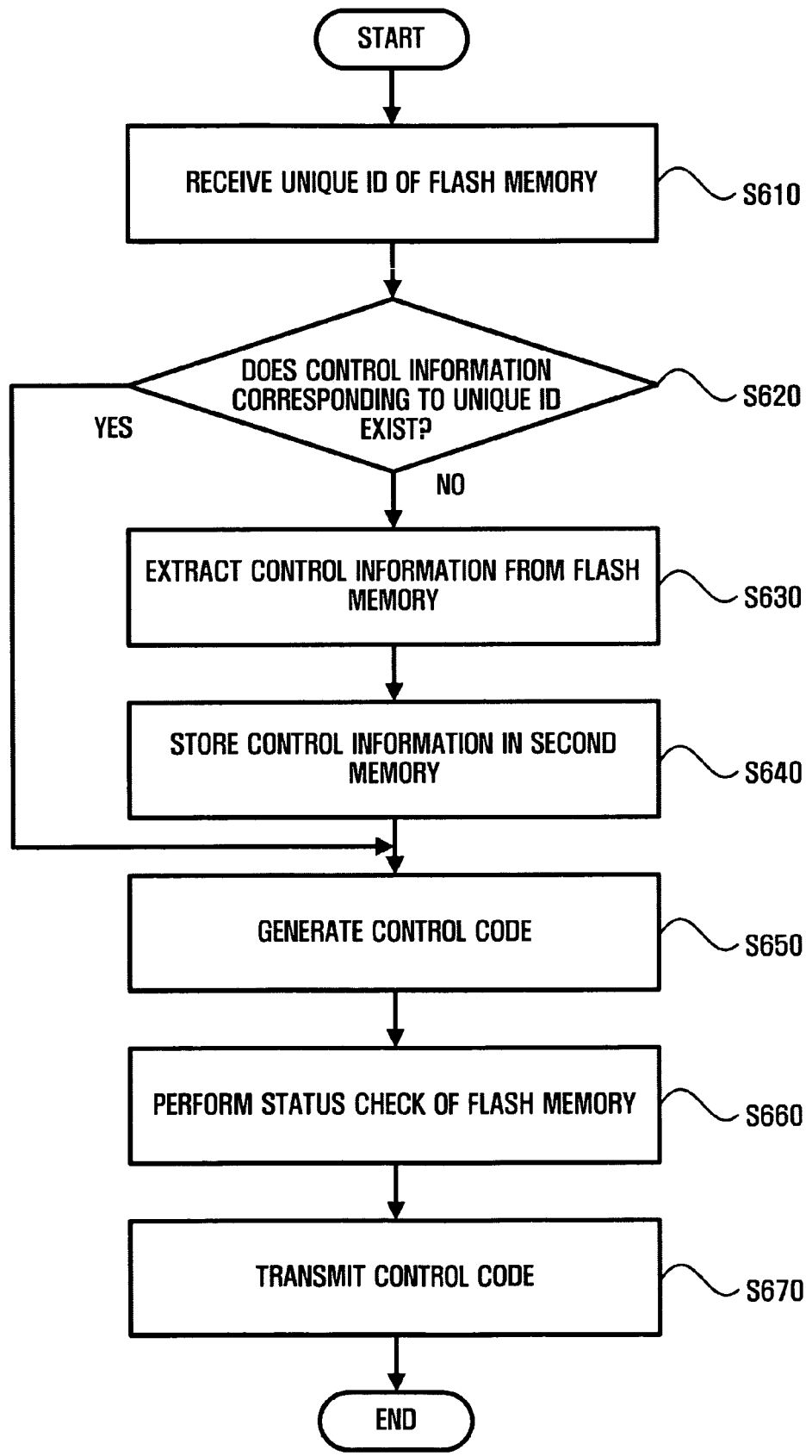
FIG. 6 is a flowchart showing a process of controlling a flash memory according to an exemplary embodiment of the present invention.

FIG. 6 is a flowchart showing a process of controlling a flash memory according to an exemplary embodiment of the present invention.

In order to control the flash memory 300, the transceiver 260 of the flash memory control unit 200 first receives a unique ID from the flash memory 300 (Operation S610). The received unique ID is transmitted to the control unit 220, and the control unit 220 checks whether or not control information corresponding to the unique ID exists among control information for a plurality of specified flash memories stored in the first memory 240 (Operation S620). Here, the specified flash memory is a flash memory arbitrarily selected by a user. For example, control information for a flash memory that is requested by the user is stored in the first memory 240, such that a process of storing the control information of the flash memory in the second memory 250 may be omitted.

Here, the first memory 240 is a nonvolatile memory, and more preferably, an OTP memory. The control information includes at least one of the number of dies, the number of planes by dies, the number of blocks, the size of a page, the number of pages by blocks, the number of sectors by pages, a position of a bad mark, supportability of a cache operation, and supportability of a copy back operation.

If the corresponding control information is stored, the control unit 220 generates the control code using the corresponding control information and the programming code stored in the first memory 240 (Operation S650).

Next, the status checking unit 230 checks the status of the flash memory 300. That is, the status checking unit 230 checks whether the flash memory 300 is executing a reading operation or writing operation, and the status check result is sent to the control unit 220 (S660).

Next, the control unit 220 reserves the transmission of the control code when the flash memory 300 is operating, or transmits the control code through the transceiver 260 when the flash memory 300 is not operating (Operation S670).

Meanwhile, when the control information corresponding to the first memory 240 is not stored, the transceiver 260 extracts the control information from the flash memory 300 (Operation S630). Next, the extracted control information is stored in the second memory 250 as a volatile memory (Operation S640).

If the control information is stored in the second memory 250, the control unit 220 generates the control code for controlling the flash memory 300 using the programming code stored in the first memory 240 and the control information stored in the second memory 250 (Operation S650).

Next, the control unit 220 refers to the status of the flash memory 300 checked by the status checking unit 230 (Operation S660) and, when the flash memory 300 is operating, transmits the generated control code through the transceiver 260 (Operation S670).

It will be understood that each block of the block diagram of FIG. 2 and combinations of operations in the flowchart of FIG. 6 can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the block diagrams may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

According to the apparatus and method for controlling a flash memory of the present invention, the following effects can be obtained.

First, the control information of the flash memory stored in a predetermined volatile memory is updated whenever the kind of the flash memory is changed, and the changed flash memory is controlled using the updated control information. Therefore, costs for providing an additional flash memory controller according to the kind of the changed flash memory can be saved.

Second, the control information is extracted from the flash memory that stores the control information, and the flash memory is controlled using the extracted control information. Therefore, control for different flash memories can be simply performed.

What is claimed is:

1. An apparatus for controlling a flash memory, the apparatus comprising:
   a flash memory which stores its own control information required for controlling the flash memory;
   a first memory which stores a programming code for controlling the flash memory, wherein the programming code does not include information particular to the flash memory;

a control unit which generates a control code for controlling the flash memory by assigning the control information to the programming code, wherein the control code includes information specific to the flash memory; and a transceiver which transmits the control code.

2. The apparatus of claim 1, wherein the control information comprises at least one of a number of dies, a number of planes by dies, a number of blocks, a size of a page, a number of pages by blocks, a number of sectors by pages, a position of a bad mark, a supportability of a cache operation, and a supportability of a copy back operation.

3. The apparatus of claim 1, wherein the first memory comprises a nonvolatile memory.

4. The apparatus of claim 1, wherein the first memory stores control information for a specified flash memory arbitrarily selected by a user.

5. The apparatus of claim 4, wherein, if the flash memory is the same as the specified flash memory, the control unit generates the control code for controlling the flash memory by assigning the control information stored in the first memory for the specified flash memory to the programming code.

6. The apparatus of claim 1, further comprising a second memory temporarily storing the control information.

7. The apparatus of claim 6, wherein the second memory comprises a volatile memory.

8. A method of controlling a flash memory, the method comprising:

receiving control information from a flash memory, the control information being required for controlling the flash memory;

generating a control code for controlling the flash memory by assigning the control information to a predetermined programming code, wherein the programming code does not include information particular to the flash memory and the control code includes information specific to the flash memory; and transmitting the control code.

9. The method of claim 8, wherein the control information comprises at least one of a number of dies, a number of planes by dies, a number of blocks, a size of a page, a number of pages by blocks, a number of sectors by pages, a position of a bad mark, a supportability of a cache operation, and a supportability of a copy back operation.

10. The method of claim 8, wherein the programming code is information that is stored in a first memory as a nonvolatile memory.

11. The method of claim 10, further comprising storing control information for a specified flash memory arbitrarily selected by a user in the first memory.

12. The method of claim 11, wherein, if the flash memory is the same as the specified flash memory, the generating of the control code comprises generating the control code for controlling the flash memory by assigning the control information stored in the first memory for the specified flash memory to the programming code.

13. The method of claim 8, further comprising temporarily storing the control information in a second memory.

14. The method of claim 13, wherein the second memory is implemented as a volatile memory.

* * * * *